United States Patent [19]

Hermann et al.

[11] Patent Number: 4,875,568
[45] Date of Patent: Oct. 24, 1989

[54] ESCALATOR HANDRAIL DRIVE

[75] Inventors: Dietrich E. Hermann, Vechelde; Ralf Holzhauer, Wetter, both of Fed. Rep. of Germany

[73] Assignee: Otis Elevator Company, Farmington, Conn.

[21] Appl. No.: 294,532

[22] Filed: Jan. 5, 1989

[51] Int. Cl.⁴ ............................................. B65G 15/00
[52] U.S. Cl. ...................................... 198/335; 198/835
[58] Field of Search ............... 198/335, 336, 337, 330, 198/331, 835

[56] References Cited

U.S. PATENT DOCUMENTS

| | | | |
|---|---|---|---|
| 2,929,483 | 3/1960 | Minejro Jin | 198/331 |
| 3,414,109 | 12/1968 | Clark | 198/335 |
| 4,134,883 | 1/1979 | Mendelsohn et al. | 198/335 X |
| 4,200,177 | 4/1980 | Sato et al. | 198/335 |

FOREIGN PATENT DOCUMENTS

| | | | |
|---|---|---|---|
| 664866 | 6/1965 | Belgium | 198/331 |
| 1239829 | 5/1967 | Fed. Rep. of Germany | 198/335 |
| 52-31479 | 3/1977 | Japan | 198/335 |
| 387901 | 5/1965 | Switzerland | 198/335 |
| 779236 | 11/1980 | U.S.S.R. | 198/336 |

Primary Examiner—Robert J. Spar
Assistant Examiner—Cheryl L. Gastineau
Attorney, Agent, or Firm—William W. Jones

[57] ABSTRACT

An escalator handrail is driven by a pair of angularly offset rollers. The angular offset of the rollers causes a wedging effect at the roller nip whereby the driving force imparted by the rollers to the handrail is increased.

6 Claims, 2 Drawing Sheets

ESCALATOR HANDRAIL DRIVE

DESCRIPTION

1. Technical Field

This invention relates to an escalator or travelator handrail drive mechanism, and more particularly to such a mechanism which utilizes two or more pressure rollers to frictionally drive the handrail.

2. Background Art

The handrails of a moving people conveyor such as an escalator or travelator are typically generally U-shaped rubber belts which move along guide rails in synchronism with the steps or tread of the conveyor. The handrails are usually driven by a chain and sprocket assembly which is connected to the same motor that drives the step or tread chains. The handrails are typically fed through the nip of a mangle-type roller drive which, in turn is driven by the chain and sprocket assembly. When a standard mangle roller drive is used, the belt will be biased against a driving roller disposed on one side of the belt, by a contact pressure roller disposed on the other side of the belt. The contact pressure roller will be spring-biased, and the axes of the driving roller and contact pressure roller will be contained in a plane which is perpendicular to the plane of the belt. The driving force which moves the handrail is thus equal to the product of the force exerted on the handrail by the contact pressure roller and the friction value. Thus the driving force exerted on the handrail is directly proportional to the force that the spring exerts on the contact pressure roller.

DISCLOSURE OF INVENTION

The present invention relates to a mangle-type handrail drive assembly which is operable to increase the driving force exerted on the handrail without increasing the spring force exerted on the contact pressure roller. The drive assembly of this invention utilizes a contact pressure roller which is biased in a direction substantially parallel to the direction of travel of the handrail. The axis of the contact pressure roller and the axis of the driving roller will then be contained in a plane which is disposed at an angle to a plane which contains the driving roller axis and which is also perpendicular to the direction of travel of the handrail. This angular offset of the roller axes serves to increase the driving force exerted on the handrail without the need to increase the spring pressure exerted on the contact pressure roller.

It is therefore an object of this invention to provide an improved mangle-type escalator or travelator handrail drive system.

It is a further object of this invention to provide a handrail drive system of the character described wherein increased driving force for the handrail can be generated without increasing spring pressure exerted on the rolls.

These and other objects and advantages of the invention will become more readily apparent from the following detailed description of a preferred embodiment of the invention when taken in conjunction with the accompanying drawings, in which.

BEST MODE FOR CARRYING OUT THE INVENTION

Figure 1:
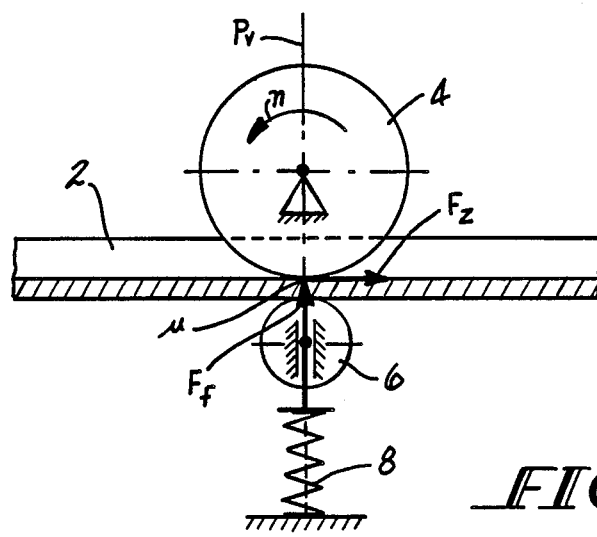
FIG. 1 is a side elevation of a mangle-type handrail drive of the type known to the prior art.

Referring now to FIG. 1, there is shown, somewhat schematically, a mangle-type handrail drive formed in accordance with the prior art. As shown in FIG. 1, the handrail 2 is being moved from left to right. The handrail 2 passes through the nip between a driving roller 4 and a contact pressure roller 6, the latter of which being biased toward the driving roller 4 by a coil compression spring 8. The driving roller 4 is rotated in the direction of arrow N by a chain and sprocket drive (not shown), and the pressure roller 6 forces the handrail 2 against the driving roller 4 with a force $F_f$ which is proportional to the force exerted on the roller 6 by the spring 8. The driving force $F_z$ will be equal to the product of $F_f$ multiplied by $\mu$, the coefficient of friction per the following equation:

$$F_z = \mu F_f$$

Figure 2:
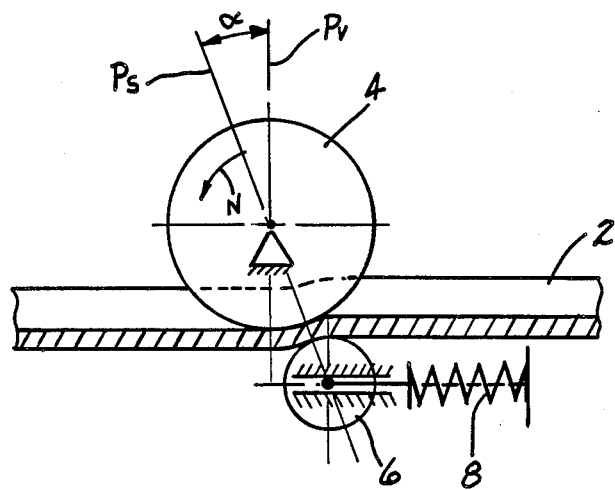
FIG. 2 is a side elevation similar to FIG. 1 but showing the handrail drive of this invention.

Referring now to FIG. 2, a handrail drive formed according to this invention is shown. The handrail 2 is once again being moved from left to right as viewed in FIG. 2, and the drive roller 4 is being rotated in the direction of the arrow N. The pressure contact roller 6 is mounted below the handrail 2, and is biased by the spring 8 in a direction which is substantially parallel to the plane of movement of the handrail 2, and which is opposite to the direction of movement of the handrail 2. The axes of the rollers 4 and 6 are contained in a plane $P_s$ which is angularly offset from the plane $P_v$ which contains the axis of the roller 4 and is perpendicular to the plane of the handrail 2.

Figure 3:
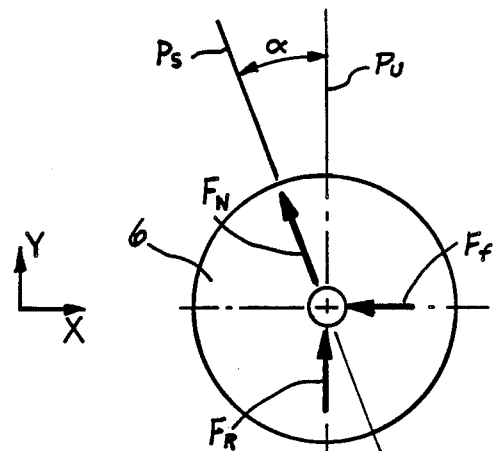
FIG. 3 is a force balancing diagram relating to the handrail drive of this invention.

The forces generated in the roller nip are shown in FIG. 3. In FIG. 3, $F_f$ is the spring force exerted on the roller 6; $F_n$ is the force exerted on the handrail 2 by the roller 6; and $F_r$ is the vertical component of $F_n$. It will be noted that $F_n$ is the result of vectoring forces $F_f$ and $F_r$ whereby:

$$F_n = F_f \times \frac{1}{\sin \alpha}$$

Whereas $\alpha$ is the included angle between planes $P_v$ and $P_s$. The driving force $F_z$ acting on the handrail is thus:

$$F_z = \mu \left( F_f \times \frac{1}{\sin \alpha} \right)$$

Thus the belt driving force $F_z$ is increased in value by the subject driving mechanism without increasing the spring force $F_f$. The $\alpha$ values should preferably be in the range of about 3° to about 15°.

Figure 4:
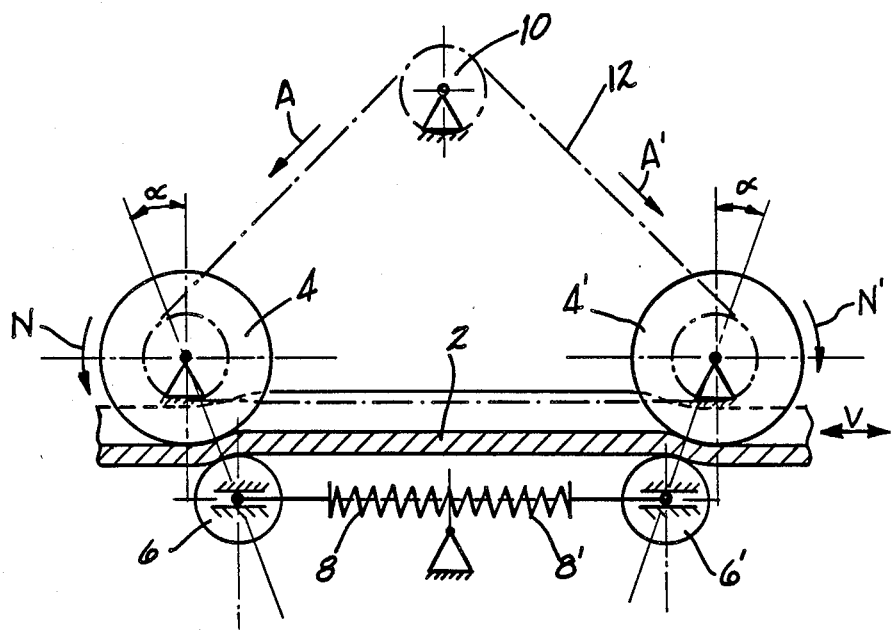
FIG. 4 is a schematic representation of a handrail drive mechanism embodying this invention and adapted to drive the handrail in either direction.

Referring to FIG. 4, a bidirectional handrail drive mechanism formed in accordance with the invention is shown. For driving the handrail 2 to the right as seen in FIG. 4, the drive roller 4 and pressure contact roller 6 provide the driving force. In such case, the power sprocket 10 is rotated so as to move the chain 12 in the direction of arrow A. To drive the handrail 2 to the left as shown in FIG. 4, the power roller 4' and pressure contact roller 6' provide the driving force. In the latter case, the power sprocket 10 drives the chain 12 in the direction of the arrow A'.

It will be readily appreciated that the drive mechanism of the invention is of simple manufacture, constituting a readily achievable rearrangement of the prior art mechanism components. The drive force can be increased without increasing the contact pressure roller spring force by a simple realignment of parts. The drive of this invention is useful with escalator or travelator systems which experience increased friction for various reasons.

Since many changes and variations of the disclosed embodiment of the invention may be made without departing from the inventive concept, it is not intended to limit the invention otherwise than as required by the appended claims.

What is claimed is:

1. A device for moving a handrail component of a people conveying assembly, said device comprising:
   (a) a powered driving roller for contacting one surface of said handrail to impart a driving force thereto resulting from rotation of said driving roller about its axis;
   (b) a contact pressure roller for contacting another surface of said handrail opposite said one surface thereof, said pressure roller being rotatable about its axis and operable to bias said handrail against said driving roller; and
   (c) spring means for biasing said contact pressure roller toward said driving roller, said spring means biasing said axis of said contact pressure roller in a plane substantially parallel to planes containing said handrail, and in a direction which is opposite to the direction of movement of said handrail.

2. The device of claim 1 wherein said axes of said driving roller and said contact pressure roller are contained in a first plane which intersects a second plane containing said axis of said driving roller which second plane is perpendicular to said handrail, said first and second planes defining a predetermined included acute angle at said axis of said driving roller.

3. The device of claim 2 wherein said predetermined acute angle is in the range of about 3° to about 15°.

4. A device for moving a handrail component of a people conveying assembly, said device comprising:
   (a) a powered driving roller for contacting one surface of said handrail to impart a driving force thereto resulting from rotation of said driving roller about its axis;
   (b) a contact pressure roller for contacting another surface of said handrail opposite said one surface thereof, said pressure roller being rotatable about its axis and operable to bias said handrail against said driving roller;
   (c) spring means for biasing said contact pressure roller toward said driving roller, said spring means biasing said axis of said contact pressure roller in a directional plane which is substantially parallel to planes containing said handrail and does not pass through said driving roller axis; and
   (d) said driving roller axis and said contact pressure roller axis being contained in a first plane which forms with a second plane that is perpendicular to said handrail and contains said axis of said driving roller an included acute angle.

5. The device of claim 4 wherein said included acute angle is in the range of about 3° to about 15° to planes containing said handrail.

6. The device of claim 4 wherein said contact pressure roller is biased by said spring means in a direction opposite to the direction of movement of said handrail.

* * * * *